United States Patent Office 3,268,501
Patented August 23, 1966

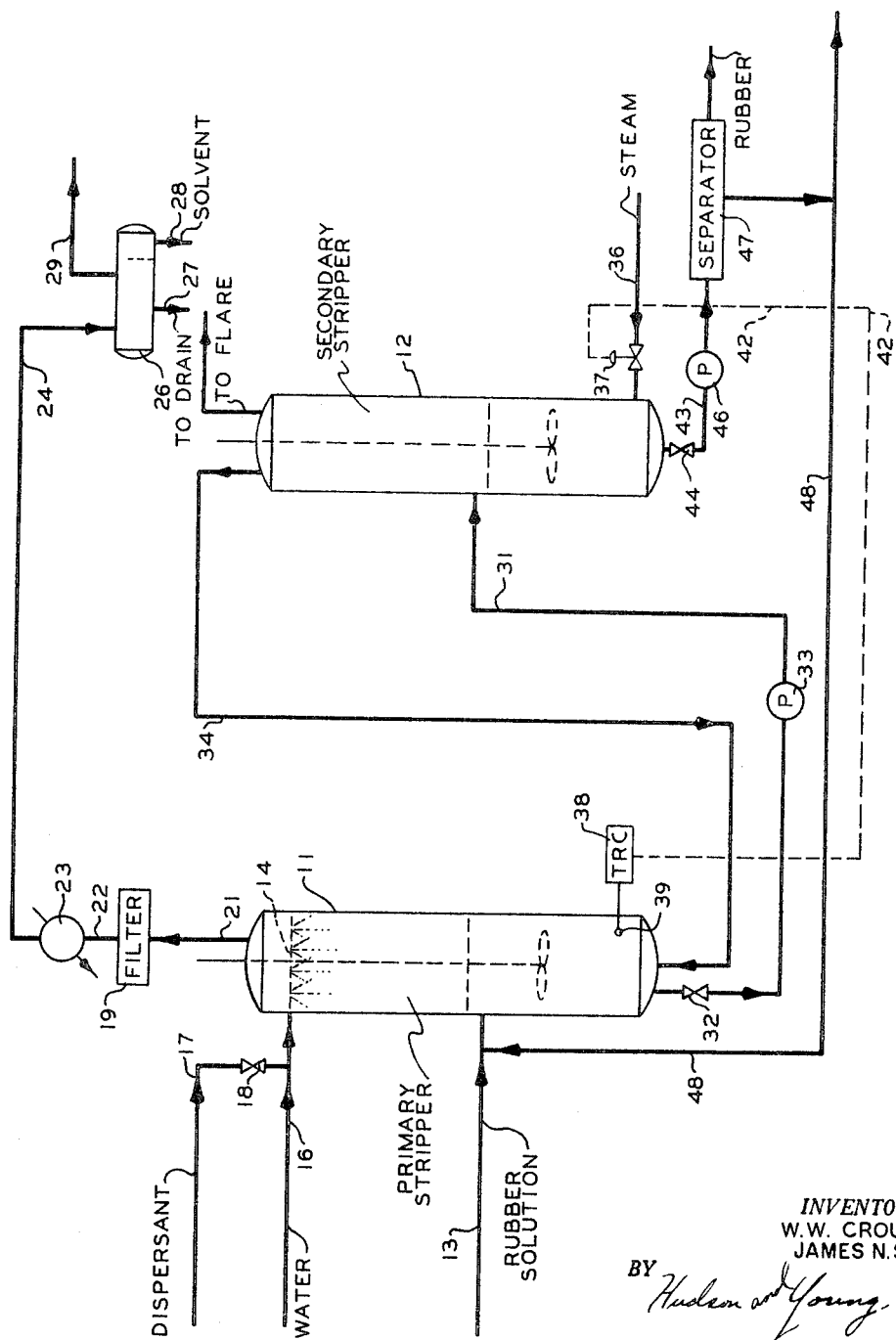

3,268,501
RECOVERY OF POLYMERS FROM SOLUTION
Willie W. Crouch and James N. Short, Bartlesville, Okla., assignors to Phillips Petroleum Company, a corporation of Delaware
Filed Dec. 1, 1960, Ser. No. 73,055
7 Claims. (Cl. 260—94.7)

This invention relates to recovery of polymers from solution.

In recent years a great deal of work has been done in the development of new types of polymeric materials, primarily rubbery materials, wherein the polymer is produced in the presence of organometal initiators. The products of such polymerization processes are recovered from the polymerization zone as a solution in a hydrocarbon solvent. Of the various recovery processes suggested, steam stripping appears to have a commercial advantage. However, in some types of operation, difficulties have arisen because the product is not obtained as a crumb dispersed in the water. For subsequent operation, it is preferable to have the polymer as a crumb in a water slurry.

We have discovered a method by which rubber can be obtained in crumb form in a water slurry from a solution of the material in a hydrocarbon solvent.

The object of this invention is to obtain such a slurry.

Accompanying and forming a part of this disclosure is a drawing showing apparatus in which my invention can be used.

Broadly, the present invention resides in the discovery that a good crumb can be obtained from a solution of rubber in a hydrocarbon solvent by steam stripping by adding to the stripping zone an alkali metal salt of an alkyl sulfate or an alkylbenzene sulfonate.

The process of the invention can best be understood from the drawing which shows a primary stripper 11 and a secondary stripper 12. Rubber solution supply conduit 13 extends to an intermediate portion of primary stripper 11. In the upper portion of this stripper 11 there are provided spray nozzles 14, these being connected to a water supply conduit 16. Communicating with conduit 16 is a dispersant supply conduit 17 having valve 18 therein. Filter 19 is provided, this filter being connected to the upper end portion of stripper 11 by conduit 21. Conduit 22 extends from filter 19 to condenser 23 and conduit 24 extends from condenser 23 to phase separator 26. Phase separator 26 is provided with a water removal conduit 27, a solvent removal conduit 28 and a conduit 29 extending to a flare (not shown). Conduit 31 extends from the lower end portion of stripper 11 to an intermediate portion of stripper 12, this conduit having valve 32 and pump 33 therein. Conduit 34 extends from the upper end portion of stripper 12 to the lower end portion of stripper 11. Steam supply conduit 36 extends into the lower end portion of stripper 12, this conduit being provided with motor valve 37 therein. A temperature recorder controller 38 is connected to temperature sensing means 39 in the lower portion of stripper 11 and the output from controller 38 is operatively connected to motor valve 37 by conduit 42. Conduit 43, having valve 44 and pump 46 therein, extends from the lower end portion of stripper 12 to a separator 47. Conduit 48 provides water recycle from the separator to stripper 11.

The lithium, sodium, potassium, rubidium, and cesium alkyl sulfates and alkylbenzene sulfonates can be used to prevent agglomeration of the polymer during steam stripping. The sodium and potassium salts are preferred. Usual amounts range from 0.01 to 1 pound per 100 pounds of rubber charged to the stripping process. A preferred range is 0.01 to 0.5 pound of the sulfate and 0.01 to 0.8 pound of the sulfonate on the same basis.

Sodium lauryl sulfate, because it is readily available commercially, is a preferred sulfate. However, salts containing 8 to 18 carbon atoms in the chain can also be used. Examples include sodium n-octyl sulfate, potassium capryl sulfate, lithium n-decyl sulfate, rubidium myristyl sulfate, cesium cetyl sulfate, and sodium stearyl sulfate. Mixtures can be used. A common source for the production of the sulfates is the mixture of fatty alcohols made by reducing the mixed fatty acids of coconut oil. This mixture consists of about 15 percent mixed $C_8$ and $C_{10}$ alcohols, 40 percent $C_{12}$ alcohol, 30 percent $C_{14}$ alcohol and 15 percent mixed $C_{16}$ and $C_{18}$ alcohols. Various cuts of this mixture are also used.

In the class of sulfonates the sodium salt of sodium dodecylbenzene sulfonate is the most widely used. As long as the sulfonate contains an alkyl group of 8 to 18 carbon atoms it is suitable for use in this invention. Examples in addition to sodium dodecylbenzene sulfonate include lithium octylbenzene sulfonate, sodium nonylbenzene sulfonate, potassium decylbenzene sulfonate, rubidium undecylbenzene sulfonate, cesium tridecylbenzene sulfonate, lithium ethyldodecylbenzene sulfonate, sodium hexadecylbenzene sulfonate, potassium octadecylbenzene sulfonate. Mixtures can be used. In some cases the commercial product contains sulfonates with a mixture of alkyl groups. One such material is the kerylbenzene sulfonate prepared by alkylating benzene with a kerosene fraction having an average of about 14 carbon atoms per molecule.

The recovery process is operated to maintain a low concentration of alkali metal sulfate or sulfonate in the aqueous medium filling the stripper. The dispersant can be added periodically or continuously to maintain the concentration at the desired level.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms per molecule. Examples of conjugated dienes which can be used include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2=C<$ group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. An important group of polymers is those with substantially all one type of structure such as cis-polybutadiene, trans-polybutadiene, cis-polyisoprene and trans-polyisoprene. However, polymers containing substantial amounts of two or more types of configuration, such as polybutadiene formed by approximately equal amounts of cis and trans 1,4-addition, can be treated according to this invention.

The polymers are prepared in the presence of organic solvents including paraffins, cycloparaffins and aromatic hydrocarbons which are relatively inert, non-deleterious to the catalyst and liquid under the conditions of the process. Examples include the paraffin hydrocarbons such as propane, butane, pentane, isooctane; cycloparaffins, such as cyclohexane, and methylcyclohexane; and aromatic compounds, such as benzene, toluene, and the like. The solvent is one which is normally liquid under operating conditions employed, which will dissolve the polymer, and which can be vaporized in the presence of steam or hot water.

A large number of initiator systems are suitable for the production of the polymers.

One type of initiator system is a two or more component catalyst wherein one component is an organometal compound, including those where one or more organo groups is replaced by a halogen; a metal hydride; or a metal of Group I, II or III; and the second component is a Group IV to VI compounds, e.g., salt or alcoholate. This type of initiator system is fully described with a group of examples in columns 5 through 8 of Patent 2,886,561, dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio - 1,2 - diphenylethane, 9-10-dilithio-9,10-dihydroanthracene, 1,2-dilithio-1,8-diphenyloctane, 1,3,5-trilithiopentane, 1,5,15-trilithioeicosane, 1,3,5 - trilithiocyclohexane, 1,2,5-trilithionaphthalene, 1,3,5-trilithioanthracene, 1,3,5,8-tetralithiodecane, 1,5,10,20-tetralithioeicosane, 1,2,4,6 - tetralithiocyclohexane, 1,2,3,5-tetralithio-4-hexylanthracene, 1,3-dilithio-4-cyclohexane, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and an alkyl metal or alkyl metal halide wherein one but not all of the alkyl groups can be replaced by halogen. The Group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltous chloride, cobaltous sulfate, cobaltous nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium tetrachloride, and iodine; and triisobutylaluminum, titanium tetraiodide and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The precent of the total unsaturation present as trans 1,4- is calculated according to the following equation and consistent units:

$$\epsilon = \frac{E}{tc}$$

where:
$\epsilon$=extinction coefficient (liters - mols$^{-1}$ - microns$^{-1}$);
$E$=extinction (log $Io/I$); $t$= path length (microns); and
$c$=concentration (mols double bond/liter). The extinction is determined at the 10.35 micron band and the extinction coefficient used is $1.21 \times 10^{-2}$ (liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 15 percent rubber by weight. However, the broader range of 1 to 25 percent rubber is applicable, the higher concentration resulting in greater difficulty in mixing the rubber solution with the water. If effective mixing systems are available, it is quite possible to work with solutions containing more than 15 percent rubber.

The following examples illustrate the advantage obtained by using our invention:

*Example I*

Butadiene was polymerized in accordance with the following recipe:

| | Parts by weight |
|---|---|
| 1,3-butadiene | 100 |
| Toluene | 1200 |
| Triisobutylaluminum | 0.65 |
| Titanium tetraiodide | 0.486 |
| Polymerization temperature, ° F. | |
| Initiation | 10 |
| Control | 40 |
| Time, hours | 8.2 |
| Conversion, percent | 88 |
| ML-4 at 212 ° F. | 36 |

Charge order: Toluene, butadiene, cool to 10° F., triisobutylaluminum, titanium tetraiodide.

Polymerization was effected in an atmosphere of nitrogen. Butadiene was dried by passing it through silica gel dryers. Toluene was passed through bauxite dryers to remove the major portion of the water and drying was completed with a prepurified nitrogen stream passed countercurrent to the toluene stream in a packed column. Triisobutylaluminum was charged as a 20 percent solution in toluene. Titanium tetraiodide was charged as a one percent dispersion in toluene.

All runs were shortstopped with water and one part by weight per 100 parts rubber of antioxidant [2,2′-methylene-bis(4-methyl-7-tert-butylphenol)] was added as a 20 weight percent solution in toluene. The polymer solution was given two cold water washes using a volume of water slightly greater than the solution volume for each wash. The resulting solution contained 59 grams of cis-polybutadiene (95 percent cis 1,4-addition) per liter of solution.

Water (1500 ml.) was introduced into a stainless steel beaker and 0.082 gram of sodium lauryl sulfate (Duponol ME) was added. The solution was boiled and stirred vigorously while two liters of the cis-polybutadiene solution was added at the rate of 12 to 20 milliliters per minute. As the rubber solution was introduced, vigorous boiling occurred and rubber crumbs formed. Concurrently with the addition of rubber solution, additional sodium lauryl sulfate was introduced until a total of 0.41 gram had been added. This amount corresponded to 0.35 p.h.r. (parts by weight per 100 parts rubber) of dispersant and 0.027 weight percent based on the water present at the start of the run. A coarse, filterable crumb was obtained. The beaker and stirrer remained clean, i.e., no rubber crumb adhered to these surfaces. The rubber crumb was filtered, washed, and dried.

When the foregoing run was repeated without the use of sodium lauryl sulfate, the rubber agglomerated into a single ball of polymer. Rubber stuck to the wall of the beaker and the stirrer.

Portions of the polymer with and without sodium lauryl sulfate (0.35 p.h.r.) were compounded in accordance with the following recipe:

| | Parts by weight |
|---|---|
| cis-Polybutadiene | 100 |
| Carbon black (Philblack O) [1] | 50 |
| Zinc oxide | 3 |
| Stearic acid | 0.5 |
| Flexamine [2] | 1.0 |
| Resin 731 D [3] | 5.0 |
| Aromatic oil (Philrich 5) | 5.0 |
| Sulfur | 1.75 |
| NOBS Special [4] | 0.95 |

[1] High abrasion furnace black.
[2] Physical mixture containing 65 percent of a diarylamine-ketone reaction product and 35 percent of N,N'-diphenyl-p-phenylenediamine.
[3] A disproportionated pale rosin stable to heat and light.
[4] N-oxydiethylene benzothiazole-2-sulfenamide.

The stocks were cured 30 minutes at 307° F. and physical properties determined. Results were as follows:

| | Run 1 With Dispersant | Run 2 Without Dispersant |
|---|---|---|
| $\nu \times 10^4$, moles/cc | 1.85 | 1.85 |
| 300% modulus, p.s.i | 1,230 | 1,180 |
| Tensile, p.s.i | 3,090 | 3,070 |
| Elongation, percent | 565 | 555 |
| 200° F. tensile, p.s.i | 1,735 | 1,595 |
| ΔT, °F | 47.6 | 47.9 |
| Resilience, percent | 73.0 | 73.1 |
| Shore A hardness | 57.5 | 57 |

OVEN AGED 24 HOURS AT 212° F.

| | | |
|---|---|---|
| 300% modulus, p.s.i | 2,100 | 2,150 |
| Tensile, p.s.i | 2,600 | 2,450 |
| ΔT, °F | 36.8 | 35.8 |
| Resilience, percent | 81.5 | 80.6 |

These data show that the presence of the sodium lauryl sulfate had no deleterious effect on the overall properties of the rubber.

*Example II*

The polymer solution of Example I was used in this example.

Water (1500 ml.) was introduced into a stainless steel beaker and 0.118 gram of sodium dodecylbenzene sulfonate (Santomerse No. 1, neutral flakes, 40 percent active) was added. The solution was boiled and stirred vigorously while two liters of the cis-polybutadiene solution was added at the rate of 12 to 20 milliliters per minute. As the rubber solution was introduced, vigorous boiling occurred and rubber crumbs formed. Concurrently with the addition of rubber solution, additional sodium dodecylbenzene sulfonate was introduced until a total of 0.59 gram had been added. This amount corresponded to 0.50 p.h.r. (parts by weight per 100 parts rubber) of dispersant and 0.039 weight percent based on the water present at the start of the run. A filterable crumb was obtained and the sodium dodecylbenzene sulfonate had no effect on the color. The beaker and stirrer remained clean, i.e., no rubber crumb adhered to these surfaces. The rubber crumb was filtered, washed, and dried.

When the foregoing run was repeated without the use of sodium dodecyl benzene sulfonate, the rubber agglomerated into a single ball of polymer. Rubber stuck to the wall of the beaker and the stirrer.

Portions of the polymer with and without the sodium dodecylbenzene sulfonate (0.50 p.h.r.) were compounded in accordance with the following recipe:

| | Parts by weight |
|---|---|
| cis-Polybutadiene | 100 |
| Carbon black (Philblack O) [1] | 50 |
| Zinc oxide | 3 |
| Stearic acid | 0.5 |
| Flexamine [2] | 1.0 |
| Resin 731D [3] | 5.0 |
| Aromatic oil (Philrich 5) | 5.0 |
| Sulfur | 1.75 |
| NOBS Special [4] | 0.95 |

[1] High abrasion furnace black.
[2] Physical mixture containing 65 percent of a diarylamine-ketone reaction product and 35 percent of N,N'-diphenyl-p-phenylenediamine.
[3] A disproportionated pale rosin stable to heat and light.
[4] N-oxydiethylene benzothiazole-2-sulfenamide.

The stocks were cured 30 minutes at 307° F. and physical properties determined. Results were as follows:

| | Run 1 With Dispersant | Run 2 Without Dispersant |
|---|---|---|
| $\nu \times 10^4$, moles/cc | 1.92 | 1.85 |
| 300% modulus, p.s.i | 1,300 | 1,180 |
| Tensile, p.s.i | 3,200 | 3,070 |
| Elongation, percent | 540 | 555 |
| 200° F. Tensile, p.s.i | 1,770 | 1,595 |
| ΔT, °F | 45.6 | 47.9 |
| Resilience, percent | 72.5 | 73.1 |
| Shore A hardness | 58 | 57 |

OVEN AGED 24 HOURS AT 212° F.

| | | |
|---|---|---|
| 300% Modulus, p.s.i | 2,190 | 2,150 |
| Tensile, p.s.i | 2,720 | 2,450 |
| Elongation, percent | 370 | 320 |
| ΔT, °F | 33.2 | 35.8 |
| Resilience, percent | 80.8 | 80.6 |

These data show that the presence of the sodium dodecylbenzene sulfonate had no deleterious effect on the properties of the rubber.

*Example III*

Three runs were made for the polymerization of butadiene using the recipe and procedure described in Example I except that variable amounts of triisobutylaluminum and titanium tetraiodide were charged. A summary of the runs is given in the following table:

| Run No. | Triisobutyl aluminum, phr. | TiI₄, phr. | Time, Hrs. | Conv., percent |
|---|---|---|---|---|
| 1 | 0.68 | 0.49 | 2.0 | 100 |
| 2 | 0.85 | 0.49 | 5.0 | 80 |
| 3 | 0.70 | 0.50 | 5.5 | 92 |

Polymer solutions from the three runs were blended. The product had a Mooney Value (ML-4 at 212° F.) of 40, a trans content of 3.9 percent, and a vinyl content of 3.4 percent, the remainder being cis.

Coagulation of the polymer solution was effected in an enclosed 60-gallon tank. The polymer precipitated from solution in the form of rubber crumb in the presence of sodium dodecylbenzene sulfonate (Santomerse No. 3, neutral powder, 100 percent active) while polymer solution and steam were introduced at controlled rates. The sodium dodecylbenzene sulfonate was dissolved in a small amount of water and then added to approximately 30 gallons of boiling water in the coagulation tank. The polymer solution was introduced at the top of the tank while maintaining agitation in the vessel. Steam and polymer solution rates were adjusted so that a vacuum of 5 to 10 inches Hg was maintained in the tank. In order for the polymer to precipitate in crumb form, toluene removal had to be as rapid and complete as possible. The rate of crumb formation was approximately 10 pounds of dry polymer per hour.

Two runs were made using different levels of sodium dodecylbenzene sulfonate, 0.35 p.h.r. and 0.50 p.h.r. Another run was made in the absence of dispersant. The solvent was removed by steam stripping under vacuum and the polymer, which had agglomerated and was in the form of a slab, was removed through a side manhole in the coagulation tank.

The products were given two water washes and dried in an extrusion dryer at 300° F. They were then compounded in the following tread stock recipe:

| | Parts by weight |
|---|---|
| cis-Polybutadiene | 100 |
| Philblack 0 | 50 |
| Zinc oxide | 3 |
| Stearic acid | 2 |
| Flexamine | 1 |
| Resin 731D | 5 |
| Philrich 5 | 5 |
| Sulfur | 1.75 |
| NOBS Special | 0.9 |

Physical properties were determined after curing the stocks 30 minutes at 307° F. Results were as follows:

| | Dispersant | | No Dispersant |
|---|---|---|---|
| | 0.35 phr. | 0.50 phr. | |
| $\nu \times 10^4$, moles/cc | 1.72 | 1.75 | 1.67 |
| 300% modulus, p.s.i | 1,040 | 1,070 | 980 |
| Tensile, p.s.i | 2,700 | 2,750 | 2,830 |
| Elongation, percent | 540 | 550 | 600 |
| 200° F. Tensile, p.s.i | 1,630 | 1,700 | 1,650 |
| $\Delta$ T., ° F | 46.6 | 45.3 | 48.7 |
| Resilience, percent | 71.4 | 72.1 | 70.7 |
| Shore A hardness | 60.5 | 60.5 | 59.5 |

OVEN AGED 24 HOURS AT 212° F.

| | | | |
|---|---|---|---|
| 300% modulus, p.s.i | 1,770 | 1,900 | 1,730 |
| Tensile, p.s.i | 2,240 | 2,070 | 2,270 |
| Elongation, percent | 350 | 310 | 350 |
| $\Delta$ T., ° F | 33.8 | 33.4 | 34.4 |
| Resilience, percent | 80.5 | 81.1 | 80.8 |

These results demonstrate again that the presence of the sodium dodecylbenzene sulfonate had no deleterious effect on the overall properties of the rubber.

As many possible embodiments can be made of this invention without departing from the scope thereof, it is to be understood that all matter herein set forth is to be interpreted as illustrative and not as unduly limiting the invention.

We claim:

1. In the process of recovering a rubbery polymer prepared by polymerizing a monomer mixture containing at least a major portion of a conjugated diene of 4 to 8 carbon atoms from a solution of said polymer in a solvent by steam stripping in the presence of water, the improvement comprising adding to the stripping zone an alkali metal salt of a compound selected from the group consisting of alkyl sulfates containing 8 to 18 carbon atoms and alkylbenzene sulfonates containing an alkyl group of 8 to 18 carbon atoms, the amount of said salt being 0.01 to one pound per 100 pounds of rubber charged to the stripping zone.

2. In the process of recovering a polymer selected from the group consisting of cis-polybutadiene, trans-polybutadiene, cis-polyisoprene, trans-polyisoprene from a solution thereof in a solvent by steam stripping in the presence of water, the improvement comprising adding to the stripping zone an alkali metal salt of a compound selected from the group consisting of alkyl sulfates containing 8 to 18 carbon atoms and alkylbenzene sulfonates containing an alkyl group of 8 to 18 carbon atoms, the amount of said salt being 0.01 to one pound per 100 pounds of rubber charged to the stripping zone.

3. A process of recovering cis-polybutadiene from a solution thereof in toluene comprising steam stripping toluene from the solution in the presence of water to which has been added an alkali metal salt of a compound selected from the group consisting of alkyl sulfates containing 8 to 18 carbon atoms and alkylbenzene sulfonates containing an alkyl group of 8 to 18 carbon atoms, the amount of said salt being 0.01 to one pound per 100 pounds of rubber charged to the stripping zone.

4. The process of claim 3 wherein said salt is sodium lauryl sulfate.

5. The process of claim 4 wherein said sulfate used is in the range of 0.01 to 0.5 pound per 100 pounds of polymer charged.

6. The process of claim 3 wherein said salt is sodium dodecylbenzene sulfonate.

7. The process of claim 6 wherein said sulfonate used is in the range of 0.01 to 0.8 pound per 100 pounds of polymer charged.

References Cited by the Examiner

UNITED STATES PATENTS

| 2,481,876 | 9/1949 | Rhines | 260—94.7 |
| 2,607,753 | 8/1952 | Adams | 260—94.7 X |
| 2,953,556 | 9/1960 | Wolfe et al. | 260—94.7 |
| 2,971,951 | 2/1961 | Cines | 260—943 X |
| 3,042,637 | 7/1962 | Crouch | 260—94.7 |

OTHER REFERENCES

Schwartz and Perry: "Surface Active Agents," Interscience Publishers, Inc., New York, 1949, vol. 1, pages 111–121, 475, 506.

JOSEPH L. SCHOFER, Primary Examiner.

LESLIE H. GASTON, MORRIS LIEBMAN, LEON J. BERCOVITZ, R. E. WEXLER, E. J. SMITH, C. R. REAP, Examiners.